D. BARBE.
NUT LOCK.
APPLICATION FILED SEPT. 30, 1915.

1,200,797.

Patented Oct. 10, 1916.

Witnesses

Inventor
D. Barbe.
By
Attorneys.

UNITED STATES PATENT OFFICE.

DAVID BARBE, OF BOLAIR, WEST VIRGINIA.

NUT-LOCK.

1,200,797. Specification of Letters Patent. Patented Oct. 10, 1916.

Application filed September 30, 1915. Serial No. 53,421.

*To all whom it may concern:*

Be it known that I, DAVID BARBE, a citizen of the United States, residing at Bolair, in the county of Webster, State of West Virginia, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks particularly of that type including the provision of a pawl member positioned in the body of the nut.

It is in general the object of the present invention to simplify the structure and improve the efficiency of devices of this character.

It is more specifically an object to provide such a nut locking device which is adapted to be housed in the body of the nut so that its parts will not be exposed to danger of being broken by striking thereagainst but which has its operating member extensible beyond one of the faces of the nut so that upon application of means for the nut to turn the same, the locking means will be actuated to inoperative position so that such turning movement may be effected.

With the above and other objects and advantages in view, the invention resides more particularly in the novel combination, formation and arrangement of parts as more fully described hereinafter and pointed out in the appended claim.

Figure 1:
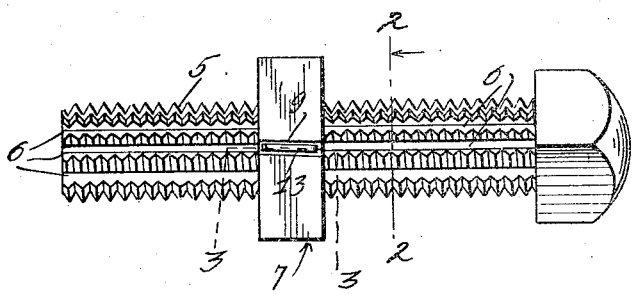
Figure 2:
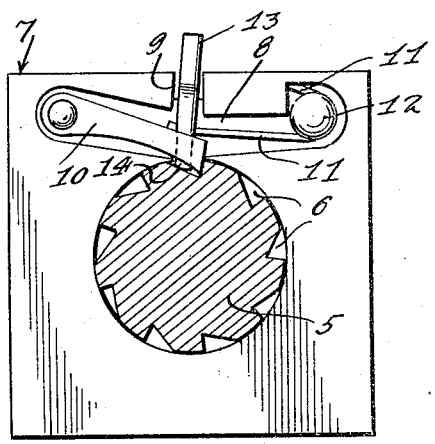
Figure 3:
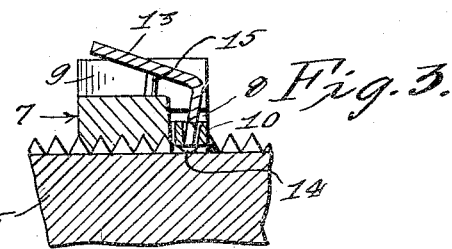
Figure 4:
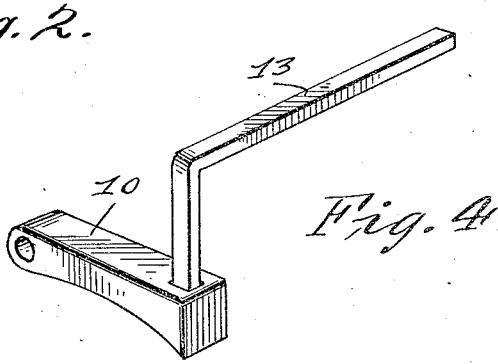

Reference is had to the accompanying drawings, wherein similar characters of reference designate corresponding parts throughout the several views, and in which:

Figure 1 is a side view of a bolt and nut constructed in accordance with the present invention. Fig. 2 is a sectional view taken transversely through the bolt and looking toward the inner face of the nut. Fig. 3 is a sectional view on the line 3—3 of Fig. 1, taken transversely through the nut. Fig. 4 is a perspective view of the locking pawl and its operating arm.

Referring now more particularly to the accompanying drawings 5 designates a threaded bolt and this bolt is provided with a series of longitudinal notches 6 in its threaded periphery which have corresponding side walls extending radially so that the locking means may have a sliding ratchet action in movement of the nut onto the bolt but will engage said radial faces to prevent movement of the nut in unscrewing from the bolt. The said nut, designated at 7, is of the usual form and may include squared faces or hexagonal faces. The inner face of the nut is provided with a transverse groove 8 which communicates in its intermediate portion with the bore and the nut is further provided with a transverse groove 9 in one of its side faces connected at one end with the groove 8. Pivoted in one end of the grooves is a pawl 10 which is engageable in the notches of the bolt to prevent unscrewing of said nut therefrom and which is normally urged to such engaging position by a spring 11 bearing thereon and having one end extended into the other end of the groove 8 and coiled with its extremity bearing against the groove, said spring being held in place by a pin 12 passed through its coil. To provide a means for releasing the coil an angular piece 13 is provided which has one end loosely passed through the engaging end of the pawl and headed at 14 to prevent its retraction, the other arm of the angular piece extends adjacent the slot 9 and when the pawl is in locking position projects at an angle therefrom. A pivot for this arm of the angular piece 13 is provided which comprises a boss 15 disposed in the bottom of the groove so that when pressure is applied to the free end of the angular piece it will rock on the boss to lift the pawl out of its respective notch to permit the nut to be unscrewed. As the angular piece 13 is necessarily secured to the pawl, the present device is so adapted that the device is wholly carried by the pawl and thus the pivotal mounting of this angular piece is greatly simplified.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention as claimed.

What I claim is:

A lock nut adapted to be associated with a bolt provided with a longitudinal groove in its threaded periphery comprising a nut body having a transverse groove in one side face communicating with the edge of its bore and with a transverse groove in the adjacent side face communicating with the first groove, a pawl in said first groove spring urged into the bore of the nut, and releasing means for said pawl comprising an angular member having one arm passed through the pawl and headed and adapted to lie in the second mentioned groove, but normally projecting at an angle outwardly therefrom and a pivot boss for the other arm of the angular member carried in said second groove.

In testimony whereof, I affix my signature, in the presence of two witnesses.

DAVID $\overset{\text{his}}{\times}$ BARBE.
mark

Witnesses:
JOHN McELWAIN,
M. V. TRACEY.

Copies of this patent may be obtained for five cents each, by addressing the "Commissioner of Patents, Washington, D. C."